United States Patent [19]

Lussiez et al.

[11] Patent Number: 4,547,348
[45] Date of Patent: Oct. 15, 1985

[54] CONDITIONING OF LATERITE PRESSURE LEACH LIQUOR

[75] Inventors: Guy W. Lussiez, Golden; Jean-Paul Duterque, Arvada, both of Colo.; Thomas W. Polkinghorn, Ft. Madison, Iowa

[73] Assignee: AMAX Inc., Greenwich, Conn.

[21] Appl. No.: 576,293

[22] Filed: Feb. 2, 1984

[51] Int. Cl.[4] .............................................. C01G 53/10
[52] U.S. Cl. ................................ 423/150; 423/146; 75/119
[58] Field of Search .................. 75/101 R, 108, 115, 75/119; 423/140, 146, 150, 158, 166

[56] References Cited

U.S. PATENT DOCUMENTS

| | | | |
|---|---|---|---|
| 3,804,613 | 4/1974 | Zundel et al. | 423/150 X |
| 3,809,549 | 5/1974 | Opratko et al. | 75/101 R |
| 3,991,159 | 11/1976 | Queneau et al. | 423/150 |
| 4,097,575 | 6/1978 | Chou et al. | 75/119 X |
| 4,098,870 | 7/1978 | Fekete et al. | 423/150 X |
| 4,110,401 | 8/1978 | Hoover et al. | 75/115 X |
| 4,195,065 | 3/1980 | Duyvesteyn | 423/150 |
| 4,410,498 | 10/1983 | Hatch et al. | 423/146 X |
| 4,415,542 | 11/1983 | Queneau et al. | 423/150 X |

Primary Examiner—Andrew H. Metz
Assistant Examiner—Nam X. Nguyen
Attorney, Agent, or Firm—Michael A. Ciomek; Eugene J. Kalil

[57] ABSTRACT

A method is provided for conditioning nickel laterite pregnant leach liquor in preparation for the recovery of nickel therefrom in which pregnant leach liquor is mixed in a reaction vessel under atmospheric pressure with an amount of roasted high-magnesium nickeliferous silicate ore to form a pulp thereof, the amount of roasted ore being at least sufficient to lower the free acid content of pregnant liquor entering the thickener to a level corresponding to a pH ranging from about 1.8 to 3. The pregnant liquor is conditioned by stirring the pulp thereof at a temperature not exceeding 100° C. for a time sufficient to lower the free acid content of the resulting conditioned pregnant liquor to the desired level and to effect substantial precipitation of iron as iron hydroxide and dissolved silica in the liquor. The treated pulp is then passed to a thickener to provide an underflow of residual roasted ore and an overflow of conditioned pregnant liquor is passed to metal recovery while withdrawing the residual roasted ore from the thickener, a portion of which is then recycled to the reaction vessel to which freshly roasted ore is also added.

28 Claims, 5 Drawing Figures

CONDITIONING OF LATERITE PRESSURE LEACH LIQUOR

This invention relates to the use of calcined or roasted high magnesium nickeliferous silicate ore, such as garnierite for neutralizing and purifying (i.e., conditioning) pregnant leach liquor produced in the high pressure, high temperature leaching of nickeliferous oxide ores, e.g., nickel laterites.

STATE OF THE ART

It is known that it is possible to recover nickel and cobalt from lateritic ores using hydrometallurgical leaching techniques carried out at high pressures and high temperatures. A known method is a leaching process developed at Moa Bay, Cuba, in which finely divided nickel laterite ore (e.g., 95% passing 325 mesh screen, U.S. Standard) is pulped to approximately 40% solids, and the nickel and cobalt selectively leached with sulfuric acid at elevated temperature and pressure (e.g., 475° F. [245° C.] and 525 psig) to solubilize about 95% each of the nickel and cobalt present. The leached pulp is cooled and then washed by countercurrent decantation, with the washed pulp going to tailings. The acid pH, which is quite low, is then neutralized with coral mud to a pH of about 2.5 to 2.8 and the resulting product liquor (containing generally about 4 to 6 grams of nickel per liter) is subjected to sulfide precipitation by preheating the leach liquor and carrying out the precipitation with $H_2S$ in an autoclave at about 250° F. (121° C.) and a pressure of about 150 psig. Usually, nickel sulfide seed is added at the feed end to assure substantially complete precipitation of the nickel and cobalt.

After the sulfide precipitate has been washed and thickened to about 65% solids, it is oxidized to nickel and cobalt sulfate in an autoclave at about 350° F. (177° C.) and a pressure of about 700 psig. The solution of dissolved nickel and cobalt is neutralized with ammonia to a pH (5.35) sufficient to precipate any iron, aluminum and chromium present using air as an oxidant, the precipitate being thereafter separated from the solution. The solution of nickel and cobalt is thereafter adjusted to a pH of about 1.5 and $H_2S$ added to selectively precipitate any copper, lead and zinc present, which precipitate is separated from the solution by filtration. Following removal of metal impurities, the nickel is then selectively recovered from the solution by various methods, one particular method comprising treating the solution in an autoclave with hydrogen at a pressure of about 650 psig at a temperature of about 375° F. (245° C.) to recover the nickel in metallic form, using nickel powder as seed material.

Pregnant liquor generated in the aforementioned Moa-Bay type leaching of nickel laterite may contain about 30 gpl (grams per liter) of free sulfuric acid, 2 gpl of aluminum and 1 gpl iron. A typical Moa-Bay type leach is one in which the ore is leached at 240°–260° C. at an acid ($H_2SO_4$) to ore ratio between about 0.22 and 0.26 and a pulp density of 33%. Many of the refining processes available for the recovery of nickel from the foregoing solution operate more effectively at lower concentrations of acids, iron and aluminum. A typical Moa Bay ore is one containing 1.35% nickel, 0.14% Co, 0.9% Mn, 0.02% Cu, and 0.04% Zn, 47% Fe, 10% $Al_2O_3$, 1% MgO and 39.5% of other constituents and water of hydration.

The amount of acid employed to leach the nickel laterite ore is generally about twice the stoichiometric amount necessary to neutralize the metal values and other acid-consuming constituents in the ore, such as magnesium and aluminum. Generally, the pH of the cooled pregnant liquor following high pressure, high temperature leaching is quite low (typically 0.5 to 0.7). At such pH's significant amounts of impurities, such as iron and silica are taken into solution. For example, in the sulfuric acid leaching of laterites at elevated temperature and pressure, e.g., 270° C. and about 800 psig, silica as quartz is generally soluble to a saturation level of about 500 to 600 ppm. However, even more silica tends to dissolve from amorphous silica liberated from silicate minerals by the acid. Thus, at 270° C. this silica may be soluble to a relatively high level, such as 1250–1500 ppm.

In the high-pressure leaching of lateritic ores, the leached pulp is subsequently subjected to flashing to bring it to atmospheric conditions for the purpose of separating the undissolved solids from the pregnant liquor by countercurrent decantation (CCD).

Under atmospheric conditions, the acid content of the pregnant liquor may be such as to effectively retain significant amounts of iron and silica in solution. It is known to adjust the pH of a pregnant liquor prior to flashing by mixing a magnesium-containing lateritic ore with a leached pulp and its pregnant liquor and to subject the mixture to high-temperature neutralization (acid kill) at an elevated temperature in the range of about 225° C. to 300° C. whereby the pregnant liquor of the leached pulp is neutralized and the magnesium-containing ore simultaneously leached to form a final pregnant liquor. One embodiment of this technique is described in U.S. Pat. No. 3,991,159. In this connection, attention is also directed to U.S. Pat. Nos. 3,804,613 and 4,097,575, the disclosures of the aforementioned three patents being incorporated herein by reference.

In U.S. Pat. No. 4,097,575, mention is made of the use of roasted high-magnesium-containing serpentine ores as opposed to the use of raw or unroasted ore as disclosed in U.S. Pat. No. 3,991,159, the finding being made that roasted ore is more efficient as a neutralizing agent.

According to U.S. Pat. No. 4,097,575, the high temperature neutralization is carried out for a time sufficient to effect neutralization of the mix at a pH not exceeding about 1.5, for example, 1.2 or less, atmospheric neutralization being also referred to for raising the pH to over 2, for example, in the neighborhood of about 3.5.

It would be desirable to provide a method for efficiently neutralizing pregnant leach liquor under atmospheric conditions using roasted high-magnesium ore (e.g. garnierite) in which magnesium and nickel extractions are maximized and in which the acid of the liquor is sufficiently neutralized to provide substantial precipitation of iron and silica and to condition the pregnant liquor for the next step in the process such as the sulfide precipitation step.

OBJECT OF THE INVENTION

It is thus an object of the invention to provide a method for conditioning nickel-containing pregnant liquor by employing an atmospheric neutralization and purification process using roasted high-magnesium ore as the neutralizing agent.

Another object is to provide a method for the atmospheric treatment of pregnant leach liquor, wherein the pregnant liquor is neutralized and purified using roasted high-magnesium nickeliferous silicate ore and wherein a portion of residual ore is recycled into the neutralization process.

These and other objects will more clearly appear when taken in conjunction with the disclosure, the appended claims and the accompanying drawings, wherein:

STATEMENT OF THE INVENTION

In its broad aspects the invention provides an atmospheric leach method for conditioning pregnant leach liquor following flashing wherein roasted high-magnesium nickeliferous silicate ore, e.g., garnierite, is added to the pregnant liquor in a mixing or reaction vessel maintained at a temperature of about 60° C. to 100° C. The amount of ore is sufficient to reduce the acid content to the desirable level. The mixture is vigorously stirred for a time sufficient to effect neutralization and substantial precipitation of iron as iron hydroxide and also silica, following which the leached mix is passed to a thickener where a solids underflow is produced (residual ore), a portion of which is recycled to the reaction vessel as roasted ore is fed to said vessel. The conditioned pregnant liquor overflow after clarification and with the proper pH is passed to the next stage of treatment, for example, sulfide precipitation. Preferably, the amount of recycle residual roasted ore is approximately twice the weight of the roasted ore fed to the reaction vessel, the ratio of recycle residual ore to the freshly roasted ore ranging by weight from about ½ to 1 to 5 to 1 and generally from about 1 to 1 to 3 to 1.

One embodiment of the invention is directed to a method for conditioning nickel laterite pregnant leach liquor in preparation for the recovery of nickel therefrom, the method comprising: feeding nickel-containing pregnant leach liquor having a free acid concentration of about 10 to 80 gpl $H_2SO_4$ and a temperature ranging from about 60° C. to 100° C. to a reaction vessel, and mixing an amount of roasted high magnesium nickeliferous silicate ore containing over 5% Mg with the pregnant liquor to form a pulp thereof, the amount of roasted ore being at least sufficient to lower the free acid content of the pregnant liquor entering the thickener to a level corresponding to a pH ranging from about 1.8 to 3. The pregnant liquor is conditioned by vigorously stirring the pulp at said temperature for a time sufficient to lower the free acid content of the resulting conditioned pregnant liquor and to effect substantial precipitation of iron as iron hydroxide and dissolved silica in said liquor, and then passing the treated pulp to a thickener to provide an underflow of residual ore and an overflow of conditioned pregnant liquor. The method is continued by passing the overflow of conditioned pregnant liquor to metal recovery, then withdrawing the residual ore from the thickener, and recycling a portion of it to the mixing vessel into which roasted ore is also added.

Figure 1:
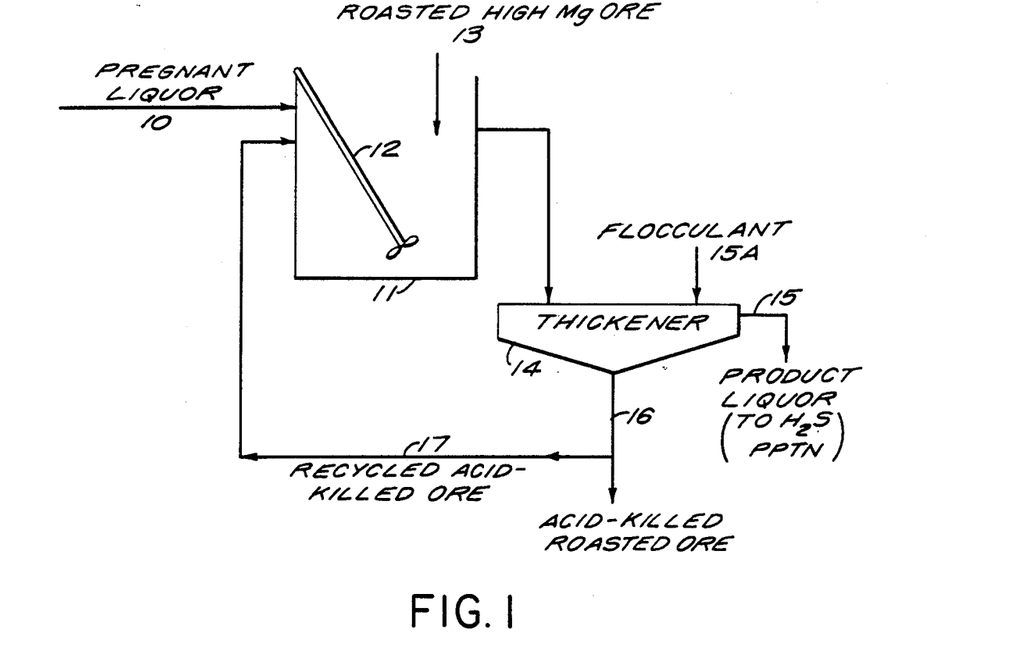
FIG. 1 is a flow sheet illustrating a simple embodiment of the invention comprising a single stage leach and a thickener.

A simple flow sheet for carrying out the invention is illustrated in FIG. 1 which shows pregnant liquor 10 following flashing from an autoclave being fed to reaction vessel 11 having a stirrer 12 therein. Roasted high-magnesium ore is added to the pregnant liquor in reaction vessel 11 and the mix vigorously stirred for a time sufficient to reduce the free acid content of the pregnant liquor to the desirable pH (e.g., pH of about 2.2 to 2.5) and to effect substantial precipitation of iron as iron hydroxide and of dissolved silica.

Following completion of neutralization, the mix or pulp is passed to thickener 14 to allow the solids to settle out and form an underflow thereof with an overflow of clarified conditioned product liquor 15 going to the next treatment step, such as sulfide precipitation. Optionally, a flocculating agent 15A is added to flocculate the precipitate to assure settling thereof.

The solids underflow comprising residual roasted ore 16 is removed from the thickener with a portion 17 thereof being recycled to reaction vessel 11 where together with the addition of freshly roasted ore 13 it reacts with incoming liquor 10. The rate of flow of pregnant liquor feed and the solids is controlled such as to allow sufficient residence time during mixing to complete the reaction. With one reaction vessel, the extent of the reaction would be necessarily low. Thus, it is preferred to use a series of reaction vessels as disclosed in the flow sheets of FIGS. 2 and 3.

The embodiment of the invention using a plurality of reaction vessels comprises: feeding nickel-containing pregnant leach liquor having a free acid concentration of about 10 to 80 gpl $H_2SO_4$ and a temperature ranging from about 60° C. to 100° C. to a series of reaction vessels comprising a first reaction vessel serially connected to at least a second reaction vessel including at least one thickener at the end of the series of reaction vessels, and adding an amount of roasted high magnesium laterite containing over 5% Mg to the pregnant liquor of at least one of the subsequent reaction vessels of said series of vessels, the amount of roasted ore added to the series of vessels being at least sufficient to lower the free acid content of the pregnant liquor entering the thickener as a pulp to a level corresponding to a pH range of about 1.8 to 3. The pregnant liquor in said series of vessels is conditioned by vigorously stirring it while at the above-specified temperature for a time at least sufficient to lower the free acid content of the pregnant liquor entering the thickener and to effect substantial precipitation of iron as iron hydroxide and dissolved silica in the liquor, following which the treated pulp is passed to the thickener to provide an underflow of residual roasted ore and an overflow of conditioned pregnant liquor. The overflow of conditioned pregnant liquor is then passed to metal recovery and the residual ore withdrawn from the thickener and a portion of it recycled, to the first reaction vessel while adding freshly roasted high-magnesium ore to at least one of the subsequent reaction vessels.

Figure 2:
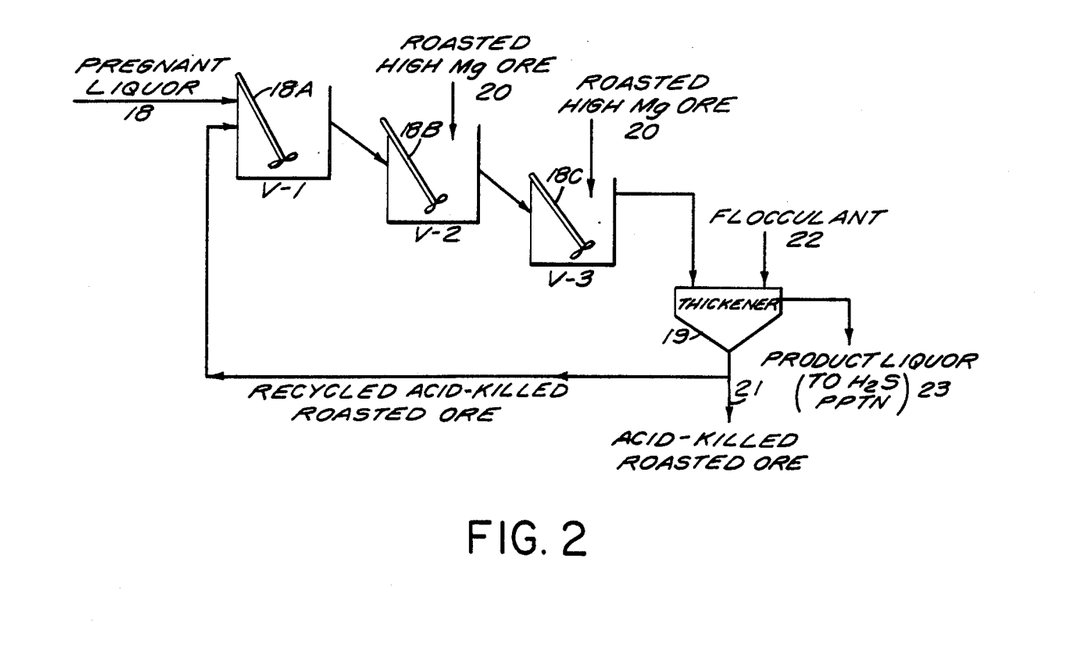
FIGS. 2 and 3 are flow sheets showing the use of a plurality of atmospheric leaching stages comprising a train of serially connected mixing vessels and a thickener for separating the conditioned pregnant liquor from undissolved solids.

The flow sheet of FIG. 2 is illustrative of the foregoing embodiment, the flow sheet comprising a train of serially connected reaction vessels V-1, V-2 and V-3 containing stirrers 18A, 18B and 18C, respectively.

Pregnant liquor 18 is fed to reaction vessel V-1 and from there to V-2, V-3 and into thickener 19.

As the pregnant liquor is flowing through the reaction vessels, roasted high-magnesium silicate ore 20 is fed to each of vessels V-2 and V-3 and the pulp formed vigorously mixed for a residence time sufficient to lower the free acid content so that the conditioned pregnant liquor reaching the thickener is at the desired pH and substantial precipitation of iron as iron hydroxide is obtained.

To assure settling of the precipitate, a flocculant 22 is optionally employed and a clarified product liquor 23 is produced suitable for $H_2S$ precipitation of the metal values present (i.e., nickel and cobalt).

Residence time in the reaction vessels is very important to assure complete reaction of the roasted ore with the pregnant liquor. To optimize the reaction and to assure a steady state system, the proposed embodiment of FIG. 3 may be employed in which four reaction vessels are employed in which the roasted ore is added only to the second vessel (V-2A).

Figures 3, 3A:
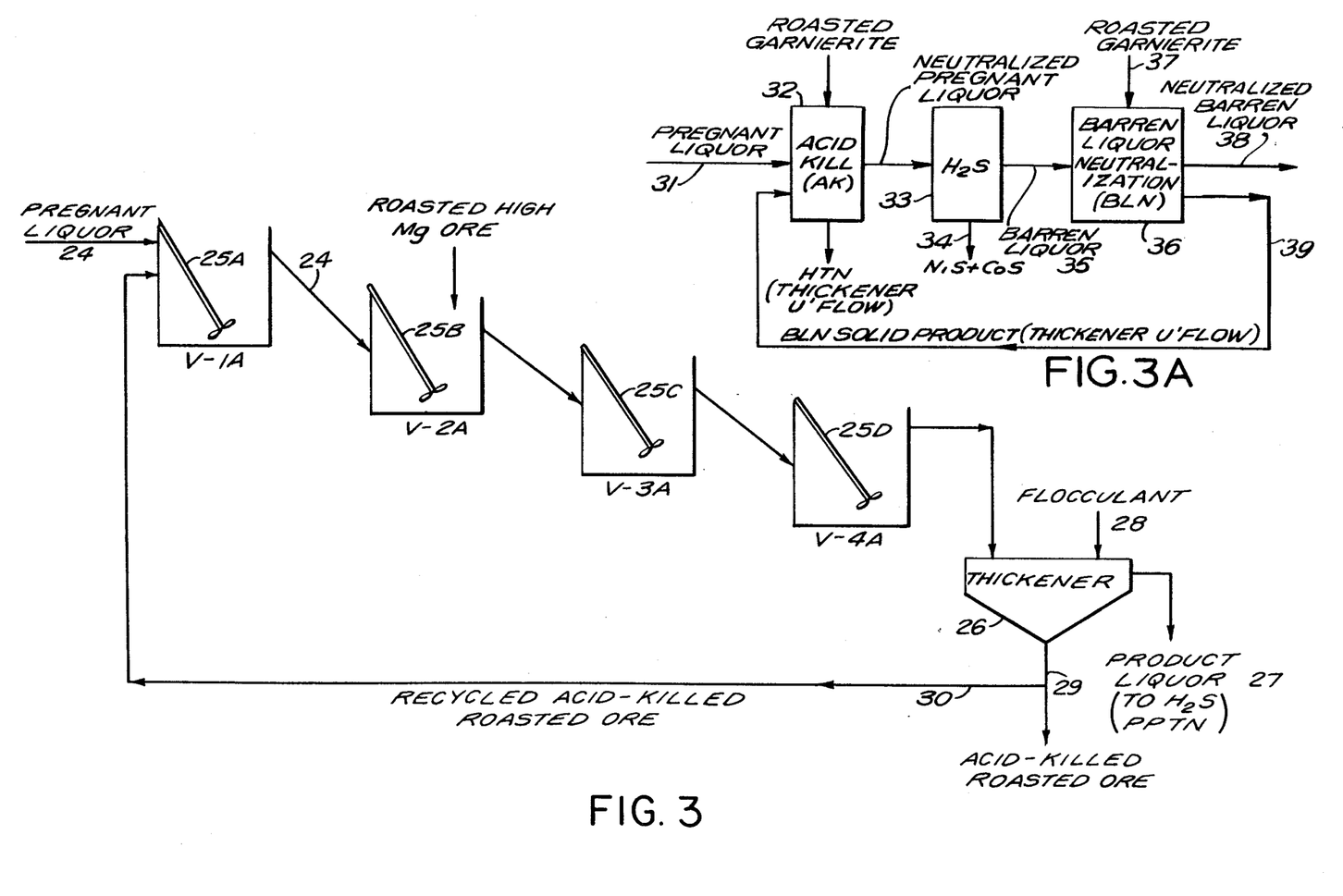
FIG. 3A is a flow sheet showing the neutralization treatment of barren liquor following precipitation of metal values from the pregnant liquor.

Thus, referring to FIG. 3, pregnant liquor 24 is added to reaction vessel V-1A as acid-killed roasted ore is being recycled to it. The vessels V-1A, V-2A, V-3A and V-4A each contain stirrers 25A, 25B, 25C and 25D, respectively. As the pregnant liquor is circulating throughout the vessels, freshly roasted high-magnesium ore is added to the second vessel V-2A. The use of reaction vessels V-2A, V-3A and V-4A enables the selection of a total residence time to assure complete reaction as well as a desirable production rate. With this system a steady state is easily obtainable so that the pulp mix entering thickener 26 is substantially fully reacted with respect to the pH content (e.g. 2.2 to 2.5) and with respect to substantial precipitation of the iron and silica as discussed hereinabove such as to provide a clarified product liquor 27 for subsequent treatment, e.g. $H_2S$ precipitation of the metal values nickel and cobalt. If necessary, a flocculant 28 may be employed. Where the situation is such that the product liquor is not sufficiently clarified, two thickeners may be employed series-connected to each other.

The underflow solids of residual roasted ore 29 is removed with a portion 30 of it recycled to the first mixing vessel V-1A. As stated earlier, the weight ratio of residual roasted ore relative to the amount of freshly roasted high-magnesium ore fed to the system may range from about ½ to 1 acid-killed ore to 5 to 1 of roasted ore, or 1 to 3, preferably approximately 2 to 1, the ratio depending upon the amount of roasted ore employed and its magnesium content.

DETAILS OF THE INVENTION

Since it is not uncommon to employ blended ore charges in running a commercial plant, various types of ore feeds were prepared and tested, a typical combined plant feed being one containing 1.9% nickel and 4.7% magnesium.

The blended ore feed comprises a garnierite fraction (G) high in magnesium and a laterite fraction (L) high in iron. The ore feed making up the combined plant feed was based on the ratio of G to L+G as disclosed in Table 1 below:

TABLE 1

| Ore No. | Ratio G/L + G | Ni | Co | Mg | Si | Al | Fe | Cr | Mn |
|---|---|---|---|---|---|---|---|---|---|
| 1 | 0.46 | 1.89 | 0.057 | 4.7 | 6.9 | 4.3 | 32.2 | 1.91 | 0.45 |

TABLE 1-continued

| Ore No. | Ratio G/L + G | Ni | Co | Mg | Si | Al | Fe | Cr | Mn |
|---|---|---|---|---|---|---|---|---|---|
| 2 | 0.77 | 2.45 | 0.082 | 9.8 | 13.9 | 2.3 | 19.8 | 0.89 | 0.85 |
| 3 | 0.56 | 1.93 | 0.070 | 6.8 | 10.1 | 3.5 | 27.4 | 1.30 | 0.52 |
| 4 | 0.56 | 2.00 | 0.090 | 5.4 | 8.0 | 4.8 | 32.0 | 1.50 | 1.20 |

Ore No. 1 in which the ratio of G to L+G is 0.46 represents a typical combined plant feed. The high limit of the magnesium content in the plant ore feed is represented by blended ore feed identified as Ore No. 2. The blended ores used for Ore No. 3 and No. 4 are average ores between the limits of Ores No. 1 and No. 2. The blends were made in different ratios to simulate various compositions in the ore body.

The total blended ore of each of Nos. 1, 2, 3 and 4 is sieved so that size fractions larger than 50 mesh are separated from minus 50 mesh material. The minus 50 mesh material, containing most of the L ore fraction, is employed in high pressure leach. The plus 50 mesh material which is mostly the G fraction is ground to all minus 6 mesh and used for garnierite roasting.

The roasting of such silicate ore is fully described in U.S. Pat. No. 4,097,575. In order to achieve optimum neutralization the ore should be roasted at a temperature below the temperature at which crystalline forsterite forms, that is, below 820° C. The ore is preferably roasted between about 500° C. to 750° C. to maximize magnesium solubility during neutralization of the pregnant liquor.

The blended ore feed shown in Table 1 was sized to provide a high magnesium fraction for each run which was roasted at a temperature of 650° C. for 2 hours. The analysis for the roasted high magnesium ores is given in Table 2 below:

TABLE 2

| Ore No. | Ni | Co | Mg | $SiO_2$ | Al | Fe | Cr | Mn |
|---|---|---|---|---|---|---|---|---|
| 1A | 2.38 | 0.13 | 11.2 | 35.3 | 3.0 | 16.3 | 1.14 | 0.84 |
| 2A | 1.85 | 0.07 | 14.7 | 37.1 | 1.9 | 10.3 | 0.63 | 0.73 |
| 3A | 1.83 | 0.10 | 14.0 | 34.0 | 3.0 | 11.0 | 1.68 | 1.13 |
| 4A | 2.08 | 0.18 | 12.3 | 32.3 | 3.1 | 14.5 | 1.79 | 1.91 |

The pregnant liquor produced from each of the ores of Table 1 is neutralized using the corresponding roasted high magnesium ore feed of Table 2. The tests correspond to a pregnant liquor feed rate of about 600 cubic meters/hour at a nickel content of about 5.5 gpl and a free acid content of about 35 to 40 gpl $H_2SO_4$ by reacting the liquor with the roasted ore at a rate corresponding to 43.8 tons/hour and a temperature of about 90° C. This would give a neutralized liquor containing about 6.1 gpl nickel at a pH level of about 2.0 to 2.5, or a free acid concentration of about 0.7 to 1.3 gpl $H_2SO_4$. In the atmospheric leach process about 52% of the nickel in the roasted ore is dissolved.

Figure 4:
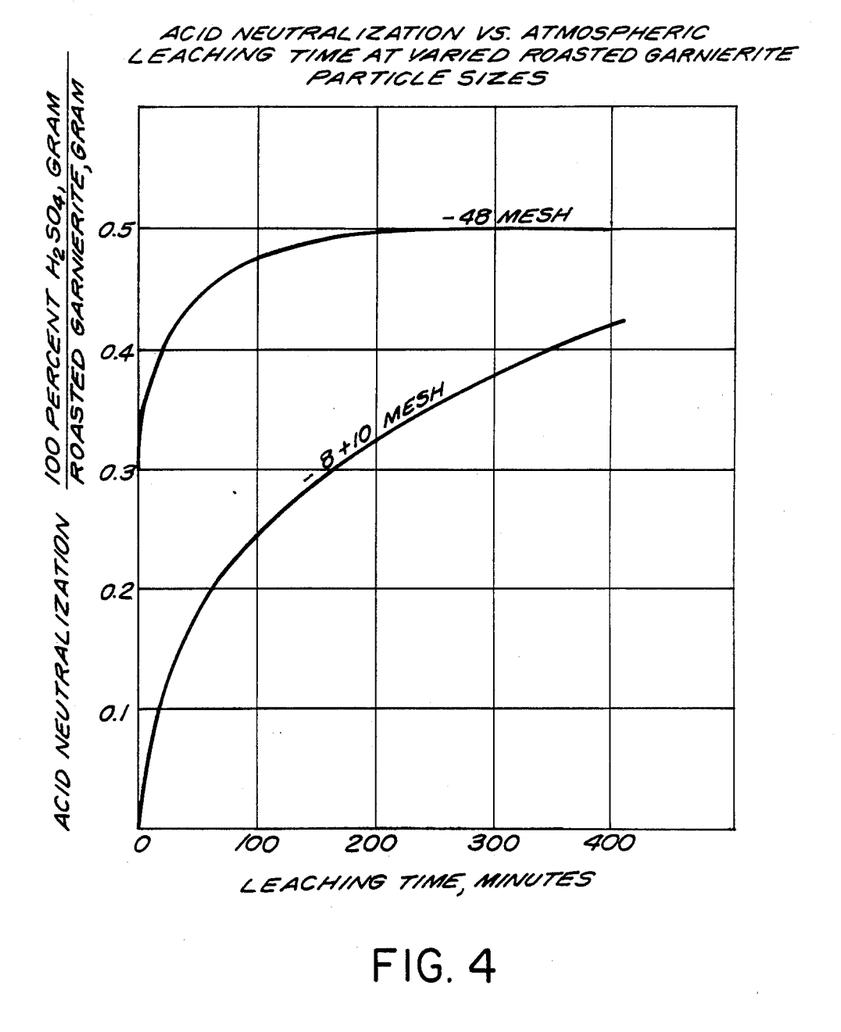
FIG. 4 depicts curves showing the effect of particle size of the roasted ore on the rate of acid neutralization and atmospheric leaching time.

Tests have shown that the particle size of the roasted ore is important with regard to the speed with which the pregnant liquor is neutralized. For example, minus 48 mesh roasted ore effected neutralization of the liquor to a pH of 2 in less than 200 minutes as compared to greater than 400 minutes with a particle size of −8+10 mesh (note FIG. 4). The finer size neutralized much more acid than the coarse size over the aforementioned time period. This enables the use of four mixing vessels in which the residence time of the last three total 180 minutes, or 1 hour per vessel. For the four vessels the total liquid residence time would be 4 hours, although the residence time may range up to about 2 hours per vessel. Liquid retention time can be reduced by increasing the solids content of the reactors by adjusting the solids recycle.

In one test four agitated atmospheric leach tanks were employed with a working volume of 4200 liters, except for run 4A in which two 2-hour tanks were used as described. The residence time for each tank averaged 2 hours. The roasted ore corresponded to Ore Nos. 1A, 2A, 3A and 4A. The slurries of the pregnant liquor and the aforementioned ore ranged in temperature from about 72° C. to 87° C. The slurry flows by gravity through bottom discharge lines from tank to tank. The leach tank levels were maintained by a vertical riser after the last tank. The leached slurry from the last leach tank was discharged to a thickener. The first and third leach tanks were equipped with steam heating coils to bring the slurry to operating temperature as required.

The pulp of solids from the underflow of the thickener after the fourth leach tank was split, one part being sent to high pressure leach, the other part being recycled to the first leach tank and fed along with pregnant liquor. Leach circuit operation for the four runs is summarized in Table 3. Mass flow rates in Table 3 were taken for the most part from daily data sheets, or based on a careful analysis of the data to select the best values consistent with both mass and component balances. Specifically, pregnant liquor, recycle residue and leach residue were estimated on a best fit basis. Other flows were, for the most part, calculated from the daily data sheets.

The four runs operated with the following recycle ratio [residual roasted ore to new roasted ore]:

|    | Average Ratio | Standard Deviation |
|----|---------------|--------------------|
| 1A | 1.9           | 0.2                |
| 2A | 1.6           | 0.2                |
| 3A | 2.2           | 0.5                |
| 4A | 2.2           | 0.05               |

Without solids recycle, roasted garnierite would have to be increased 25 percent to neutralize the pregnant liquor.

The neutralized liquor produced in all four runs (1A, 2A, 3A and 4A) was essentially the same with a pH of 2.3 to 2.4 and a ferric iron level of less than 0.4 gpl. Magnesium extraction from the roasted ore for the four runs was 70 to 80 percent.

The results are summarized in the following tables:

TABLE

Summary of Atmospheric Leach Operating Conditions

| Quantity | Units | Prototype Design | Test Run 1A | Test Run 2A | Test Run 3A | Test Run 4A |
|---|---|---|---|---|---|---|
| Number of Leach Tanks | — | 4 | 4 | 4 | 4 | 2 |
| Residence Time Per Tank | hours | 1 | 2 | 2 | 2 | 2 |
| Leach Temperature | °C. | 87 | 72 | 73 | 74 | 76 |
| Pregnant Liquor | | | | | | |
| Flow Rate | kg/hr | 4424 | 1720 | 1600 | 1410* | 1384 |
| Flow Rate | l/hr | 3912 | 1584 | 1427 | 1271 | 1234 |
| Recycle Slurry | | | | | | |
| Solids Flow | kg/hr | — | 268* | 125 | 273* | 398 |
| Solution Flow | kg/hr | — | 366 | 233 | 426 | 333 |
| Slurry Flow | kg/hr | — | 634 | 358 | 699 | 631 |
| Slurry Flow | l/hr | — | 402 | 253 | 468 | 401 |
| Garnierite Feed | | | | | | |
| Solids Flow | kg/hr | 126 | 136 | 99 | 111 | 124 |
| Solution Flow | kg/hr | 126 | 132 | 100 | 112 | 125 |
| Slurry Flow | kg/hr | 252 | 268 | 199 | 223 | 249 |
| Slurry Flow | l/hr | 174 | 179 | 132 | 147 | 164 |
| Neutralized Liquor | | | | | | |
| Flow Rate | kg/hr | 4479 | 1724 | 1598 | 1435 | 1438 |
| Flow Rate | l/hr | 3939 | 1570 | 1427 | 1289 | 1278 |

*Adjusted to suit best balance. Primary measurement or analysis not compatible within 10% of observed results.

TABLE 4

Summary of Atmospheric Leach Operating Conditions

| Quantity | Units | Prototype Design | Test Run 1A | Test Run 2A | Test Run 3A | Test Run 4A |
|---|---|---|---|---|---|---|
| Leach Residue | | | | | | |
| Solids Flow | kg/hr | 111 | 110 | 78 | 88 | 100 |
| Solution Flow | kg/hr | 111 | 136 | 130 | 123 | 99 |
| Slurry Flow | kg/hr | 222 | 246 | 208 | 211 | 199 |
| Slurry Flow | l/hr | 125 | 176 | 158 | 250 | 135 |
|  |  |  | 4/11–19 | 5/6–20 | 6/16–22 |  |
| **Roasted Garnierite [A-A]* weight percent** | | | | | | |
| Ni |  |  | 2.38 | 1.85 | 1.83 | 2.08 |
| Co |  |  | 0.13 | 0.07 | 0.10 | 0.18 |
| Fe |  |  | 16.30 | 10.30 | 11.00 | 14.50 |

TABLE 4-continued

Summary of Atmospheric Leach Operating Conditions

| Quantity | Units | Prototype Design | Test Run 1A | Test Run 2A | Test Run 3A | Test Run 4A |
|---|---|---|---|---|---|---|
| Al | | | 3.00 | 1.85 | 3.00 | 3.10 |
| Mg | | | 11.20 | 14.70 | 14.00 | 12.30 |
| Mn | | | 0.84 | 0.73 | 1.13 | 1.91 |
| Cr | | | 1.14 | 0.63 | 1.68 | 1.79 |
| SiO$_2$ | | | 35.30 | 37.10 | 34.00 | 32.30 |

Loss of Ignition (LOI) Ball Mill Feed 1.5 to 2.4% typical
Loss of Ignition (LOI) Ball Mill Discharge 8 to 12% typical

*Analyzed by Atomic Absorption

TABLE 5

Summary of Atmospheric Leach Operating Conditions

| Quantity | Units | Test Run 1A | Test Run 2A | Test Run 3A | Test Run 4A |
|---|---|---|---|---|---|
| Leach Residue [A-A] weight percent | | | | | |
| Ni | | 1.57 | 1.31 | 0.91 | 1.14 |
| Co | | 0.06 | 0.05 | 0.04 | 0.09 |
| Fe | | 21.50 | 17.00 | 16.00 | 18.30 |
| Al | | 3.09 | 3.40 | 3.20 | 3.50 |
| Mg | | 3.74 | 4.30 | 3.80 | 4.04 |
| Mn | | 0.19 | 0.22 | 0.16 | 0.64 |
| Cr | | 1.60 | 1.50 | 2.00 | 2.10 |
| SiO$_2$ | | 41.00 | 45.50 | 49.70 | 41.00 |
| Percent of feed solids remaining after leaching | | 84 | 79 | 79 | 81 |
| Pregnant Liquor | | | | | |
| Ni | gpl | 4.55 | 4.95 | 5.40 | 5.70 |
| Co | gpl | 0.12 | 0.18 | 0.17 | 0.22 |
| Fe | gpl | 3.10 | 1.40 | 2.60 | 2.40 |
| Al | gpl | 1.40 | 1.30 | 1.90 | 2.20 |
| Mg | gpl | 9.70 | 15.10 | 17.00 | 12.07 |
| Mn | gpl | 0.90 | 1.55 | 1.20 | 1.90 |
| SiO$_2$ | gpl | N/A | N/A | 0.80 | N/A |
| H$_2$SO$_4$ | gpl** | 28.60 | 30.70 | 37.80 | 41.30 |
| pH | pH | N/A | N/A | N/A | |

**Actual value calculated from titrated free acid minus acid equivalent of ferric sulfate

TABLE 6

Summary of Atmospheric Leach Operating Conditions

| Quantity | Units | Test Run 1A | Test Run 2A | Test Run 3A | Test Run 4A |
|---|---|---|---|---|---|
| Neutralized Liquor | | | | | |
| Ni | gpl | 5.20 | 5.17 | 5.96 | 6.10 |
| Co | gpl | 0.18 | 0.19 | N/A | 0.28 |
| Fe | gpl | 1.40* | 0.14 | 0.38 | 1.00 |
| Al | gpl | 1.50 | 1.20 | 2.10 | 2.40 |
| Mg | gpl | 14.70 | 19.70 | 25.30 | 20.20 |
| Mn | gpl | 1.30 | 1.70 | 1.90 | 2.65 |
| SiO$_2$ | gpl | — | — | 0.60 | — |
| H$_2$SO$_4$*** | gpl | 0.9 | 1.10 | 1.10 | 1.90 |
| pH | pH | 2.40 | 2.35 | 2.35 | 2.13 |
| Neutralizing Power [kg acid/kg roasted garnierite] | | 0.36 | 0.47 | 0.48 | 0.45 |
| Neutralizing Efficiency | | 70 | 77 | 78 | 73 |

$$\frac{\text{Actual Acid Neutralized}}{\text{Theoretical Acid which could be Neutralized}} \times 100$$

*High iron due to ferrous iron concentration of 1.0 gpl.
***Estimated from plotted data.

TABLE 7

Summary of Atmospheric Leach Operating Conditions

| Quantity | Units | Test Run 1A | Test Run 2A | Test Run 3A | Test Run 4A |
|---|---|---|---|---|---|
| Metal Extraction from Garnierite | | | | | |
| Ni | percent | 45 | 44 | 61 | 56 |
| Co | percent | 62 | 47 | 67 | 61 |
| Fe | percent | | precipitation | | |
| Al | percent | 19 | 27 | 16 | 23 |
| Mg | percent | 72 | 77 | 79 | 73 |
| Mn | percent | 81 | 76 | 89 | 73 |
| Cr | percent | 3* | 3* | 3* | 3* |
| SiO$_2$ | percent | | precipitation | | |

*Estimated value only. Data deviation is too large to calculate actual value.

The neutralizing power of the garnierite ranged between 0.36 to 0.48 kg of H$_2$SO$_4$ per kg of roasted garnierite. There is a relationship between the free acid in the pregnant liquor to be neutralized and the neutralization power of the roasted garnierite. That is, the higher the free acid is initially, the more effectively the roasted garnierite is used.

In run 4A only two 2-hour tanks or vessels were used. This was done in an attempt to demonstrate that less residence time would provide as effective a performance as the residence time obtained with four 2-hour tanks used in the previous runs. For comparison it is estimated that the two 2-hour tanks retain 90 percent of the feed for 60 minutes, compared with 200 minutes for the four 2-hour tanks.

An average neutralized liquor pH of 2.13 with iron levels over 1 gpl resulted for the entire run from operation with the two-tank configuration. The average results were due primarily to insufficient garnierite addition during the early part of the run. Table 8 shows that better results were obtained when the garnierite feed rate was increased.

TABLE 8

Garnierite Feed Rate vs Neutralized Liquor pH (Run 4A)

| Pregnant Liquor Flow kg/hr | Roasted Garnierite Feed Rate kg/hr | Neutralized Liquor pH [field log] |
|---|---|---|
| Variable garnierite magnesium content, pregnant liquor flow and recycle rate. | | |
| 1438 | 115 | 2.05 |
| 1374 | 121 | 2.09 |
| 1378 | 124 | 2.11 |
| 1352 | 128 | 2.22 |
| 1315 | 140 | 2.70 |
| 1364 | 138 | 2.61 |

Special atmospheric leaching tests conducted, in addition to the aforementioned runs, demonstrated that adequate neutralization could be accomplished in a one-hour vessel provided sufficient garnierite was used. In run 4A, it was noted that when the neutralized liquor was maintained in a storage tank, iron precipitation continued to occur which resulted in a drop in pH from 2.0 to 1.5. This occurred frequently in some laboratory tests. However, this may be avoided by increasing the residence time and/or by increasing the number of vessels.

While only one thickener is shown in the flow sheets of FIGS. 1 to 3, two may be employed wherein the overflow from the first thickener enters the second thickener which serves as a clarifier. As stated earlier, it may be desirable to use a flocculant to speed up the settling rate of the precipitate in the thickener. A typical flocculant is one referred to by the trademark SEPARAN MG-200 which is a slightly anionic polyacrylamide high polymer.

The thickener underflow generally has a pulp density ranging from about 35% to 40% of solids and may range up to about 50% solids.

Roasted garnierite ore may also be used as a neutralizing agent in the treatment of barren liquor resulting from the sulfide precipitation of metal values from the pregnant liquor. Since the acidity of the barren liquor is quite high, it presents a problem of disposal into environmental surface waters. The pH of the barren liquor which may range from about 1.8 to 3, or more generally about 2 to 2.8, should be raised to a level of about 5 to 7 before it is disposed of. For convenience, the term "barren liquor neutralization" is referred to as BLN.

Referring to the general flow sheet of FIG. 3A, the pregnant liquor 31 enters the acid-kill section 32 (for example, a train of vessels as shown in FIG. 3) where the high acidity is reduced to a pH range of about 1.8 to 3, generally from about 2 to 2.8 to prepare it for sulfide precipitation at station 33, using a sulfide-producing agent, e.g. $H_2S$.

Following precipitation of NiS and any contained cobalt as CoS, the precipitate formed is removed as sulfide product at 34 and barren liquor 35 is passed to station 36 where it is treated in a single or a series of tanks. Roasted garnierite 37 containing magnesium in excess of 5% may be employed as the neutralizing agent, the amount employed being sufficient to raise the pH to a level of about 5 to 7 (e.g., 5.5 to 7). The neutralized barren liquor 38 can be safely disposed into environmental surface water.

The amount of garnierite added depends upon the free acid content of the barren liquor which can range from about 10 to 20 grams/liter. During the treatment manganese, iron, nickel and aluminum, among other elements, may be precipitated.

In one experiment, barren liquor composition resulting from the treatment of a 1:1 Tiegabhi garnierite/laterite ore blend was as follows:

Free $H_2SO_4$: 14 gpl; Mn: 2.3 gpl; Co: 7 ppm; Al: 1.0 gpl; Mg: 25.0 gpl; Cr: 50 ppm; Fe: 0.7 gpl; Ni: 50 ppm.

According to the experiment, 75 grams of roasted garnierite per liter of the foregoing barren liquor was required to neutralize it and precipitate cations to the following levels:

Ni: 10 to 30 ppm; Al: <1 ppm; Co: 1 to 3 ppm; Cr: <1 ppm; Fe: 3 to 20 ppm; Mn: About 50% precipitated. pH: 5.5 to 7.

The above results were obtained at a retention time of 3 hours at 90° C. using three stages in a countercurrent circuit.

In a cocurrent circuit, a retention time of 4 hours at 90° C. in four stages was required with a 200% thickener underflow recycle to the first vessel. Operationally, the cocurrent circuit is easier to control.

The results of experiments indicated that the magnesium utilization from the roasted garnierite is 40% to 50% in both the cocurrent and countercurrent operations. As will be appreciated, any change in the barren liquor composition will influence the roasted garnierite requirements as illustrated below:

| Change In Cation Level | Change In Roasted Garnierite Consumption |
|---|---|
| 1 gpl Al | 18 gpl |
| 1 gpl Fe | 5.5 gpl |
| 1 gpl Mn | 5.5 gpl |
| 1 gpl Free Acid | 3 gpl |

It is important to keep the aluminum concentration as low as possible. Injection of sodium sulfate in the leach train will produce a low aluminum level.

As has been stated herein, the roasted high magnesium nickeliferous silicate ore (e.g., garnierite) should contain over 5% magnesium. Preferably, the ore should contain more than 8% magnesium.

In carrying out the invention, the pregnant liquor to be treated in the atmospheric leach is generally produced by leaching at elevated temperature and pressure a nickeliferous oxide ore having the following composition by weight: about 0.8 to 3.5% Ni (e.g., 1.25 to 2.5% Ni), about 0.005% to 1% Co, about 0.25% to 10% Mn, about 0.3% to 10% Cr, about 0.2% to 10% Al, up to about 30% Mg, about 2% to 45% $SiO_2$ and up to about 55% iron, with oxygen making up the balance, the foregoing metal values being present as oxides.

The high-magnesium ores which may be employed in the roasted form for both the pregnant and barren liquors include those having the following composition by weight: 0.8% to 5% Ni (e.g., 1.5% to 5%), about 0.005% to 1% Co, about 0.25% to 5% Mn, about 0.3% to 10% Cr, about 0.2% to 10% Al, about 5% to 30% Mg (e.g., 8% to 30%), up to 45% $SiO_2$ and less than 45% Fe, the foregoing metal values being present as oxides.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for conditioning nickel laterite pregnant leach liquor in preparation for the recovery of nickel therefrom which comprises:
   feeding nickel-containing pregnant leach liquor having a free acid concentration of about 10 to 80 gpl $H_2SO_4$ and a temperature ranging from about 60° C. to 100° C. to a reaction vessel under atmospheric pressure, mixing an amount of roasted high magnesium nickeliferous silicate ore containing over 5% Mg with said pregnant liquor in said reaction vessel at said atmospheric pressure to form a pulp thereof, said amount of roasted ore being at least sufficient to lower the free acid content of pregnant liquor to a level corresponding to a pH ranging from about 1.8 to 3 referred to room temperature,
   conditioning said pregnant liquor in said reaction vessel at atmospheric pressure by vigorously stirring said pulp at a temperature selected from said temperature range for a time sufficient to lower the free acid content of and thereby condition said pregnant liquor and to effect substantial precipitation of iron hydroxide and dissolved silica in said liquor at said pH ranging from about 1.8 to 3,
   passing the treated pulp to a thickener to provide an underflow of residual roasted ore and an overflow of conditioned pregnant liquor at said pH ranging from about 1.8 to 3, passing said pregnant liquor overflow to metal recovery,
   withdrawing said residual roasted ore from said thickener, and
   recycling a portion of said residual roasted ore to said reaction vessel while adding freshly roasted ore to said pregnant liquor fed to the reaction vessel, and while maintaining a flow of said recycle residual roasted ore through said reaction vessel,
   the ratio by weight of recycle residual ore to the freshly roasted ore added to the pregnant liquor ranging from about ½ to 1 to 5 to 1.

2. The method of claim 1, wherein the amount of free acid in said leach liquor ranges from about 30 to 60 gpl $H_2SO_4$ and the temperature ranges from about 80° C. to 100° C.

3. The method of claim 1, wherein the freshly roasted ore fed to the pregnant leach liquor in said reaction vessel contains about 8% to 30% Mg, wherein the amount of residual roasted ore recycled to the reaction vessel relative to the roasted ore added to the pregnant liquor varies as a ratio ranging from about 1 to 1 to 3 to 1, and wherein the free acid content of the pregnant liquor following conditioning is reduced to a level corresponding to a pH ranging from about 2 to 2.8 referred to room temperature.

4. The method of claim 3, wherein the pH of the conditioned pregnant liquor referred to room temperature ranges from about 2.2 to 2.5.

5. The method of claim 1, wherein the conditioned pregnant liquor is treated with a sulfide-producing agent to precipitate the nickel therein as nickel sulfide and optionally cobalt sulfide and provide a barren liquor containing 10 to 20 gpl free sulfuric acid having a pH below 2, and wherein an amount of roasted magnesium-containing nickeliferous silicate ore containing over 5% Mg is added to said barren liquor sufficient to raise the pH to a level of about 5 to 7 to enable the disposal thereof to the environment.

6. The method of claim 5, wherein the sulfide-producing agent is $H_2S$.

7. A method for conditioning nickel laterite pregnant leach liquor in preparation for the recovery of nickel therefrom which comprises:
   feeding nickel-containing pregnant leach liquor having a free acid concentration of about 30 to 60 gpl $H_2SO_4$ and a temperature ranging from about 80° C. to 100° C. to a reaction vessel under atmospheric pressure,
   mixing an amount of roasted high magnesium nickeliferous silicate ore containing about 8% to 30% Mg with said pregnant liquor in said reaction vessel at said atmospheric pressure to form a pulp thereof, said amount of roasted ore being at least sufficient to lower the free acid content of pregnant liquor to a level corresponding to a pH ranging from about 2 to 2.8 referred to room temperature,
   conditioning said pregnant liquor in said reaction vessel at said atmospheric pressure by vigorously stirring said pulp at a temperature selected from said temperature range for a time sufficient to lower the free acid content of and thereby condition said pregnant liquor and to effect substantial precipitation of iron hydroxide and dissolved silica in said liquor at said pH ranging from about 1.8 to 3,
   passing the treated pulp to a thickener to provide an underflow of residual roasted ore and an overflow of conditioned pregnant liquor at said pH ranging from about 1.8 to 3, passing said pregnant liquor overflow to metal recovery,
   withdrawing said residual roasted ore from said thickener, and
   recycling a portion of said residual roasted ore to said reaction vessel while adding freshly roasted ore to said pregnant liquor, while maintaining a flow of said recycle residual roasted ore through said reaction vessel,
   the ratio of the amount of recycle residual roasted ore to the amount of freshly roasted ore added to the pregnant liquor ranging from about 1 to 1 to 3 to 1.

8. The method of claim 7, wherein the pH of the pregnant liquor following conditioning ranges from about 2.2 to 2.5 referred to room temperature.

9. The method of claim 7, wherein the conditioned pregnant liquor is treated with a sulfide-producing agent to precipitate the nickel therein as nickel sulfide and optionally cobalt sulfide and provide a barren liquor containing 10 to 20 gpl free sulfuric acid having a pH below 2, and wherein an amount of roasted magnesium-containing nickeliferous silicate ore containing over 5% Mg is added to said barren liquor sufficient to raise the pH to a level of about 5 to 7 to enable the disposal thereof to the environment.

10. The method of claim 9, wherein the sulfide-producing agent is $H_2S$.

11. A method for conditioning nickel laterite pregnant leach liquor in preparation for the recovery of nickel therefrom which comprises:

feeding nickel-containing pregnant leach liquor having a free acid concentration of about 10 to 80 gpl $H_2SO_4$ under atmospheric pressure to a series of reaction vessels comprising a first reaction vessel serially connected to at least a subsequent reaction vessel including at least one thickener at the end of said series of reaction vessels, said pregnant liquor having a temperature ranging from about 60° C. to 100° C. and passing from said first reaction vessel through each succeeding reaction vessel to said thickener, adding an amount of roasted high magnesium nickeliferous silicate ore containing over 5% Mg to the pregnant liquor under said atmospheric pressure of at least the second reaction vessel of said series of vessels, the amount of roasted ore added to the series of vessels being at least sufficient to lower the free acid content of pregnant liquor entering the thickener as a pulp to a level corresponding to a pH ranging from about 1.8 to 3 referred to room temperature, conditioning a pulp of said pregnant liquor at said atmospheric pressure is said series of vessels by vigorously stirring said pulp while maintained at a temperature selected from said temperature range for a time at least sufficient to lower the free acid content of the pregnant liquor entering said thickener and to effect substantial precipitation of iron hydroxide and dissolved silica in said liquor at said pH ranging from about 1.8 to 3, passing the treated pulp to said thickener to provide an underflow of residual roasted ore and an overflow of conditioned pregnant liquor at said pH ranging from about 1.8 to 3, passing said pregnant liquor overflow to metal recovery, withdrawing said residual roasted ore from said thickener, and recycling a portion thereof to said first reaction vessel while adding freshly roasted high-magnesium ore to at least a subsequent reaction vessel, and while maintaining a flow of said recycle residual ore through said series of reaction vessels, the ratio by weight of recycle residual ore to the freshly roasted ore added to the pregnant liquor ranging from about ½ to 1 to 5 to 1.

12. The method of claim 11, wherein the amount of free acid in the pregnant liquor fed to said series of reaction vessels ranges from about 30 to 60 gpl $H_2SO_4$ and the temperature ranges from about 80° C. to 100° C.

13. The method of claim 12, wherein roasted ore fed to the pregnant liquor contains about 8% to 30% Mg wherein the amount of residual roasted ore recycled to the first reaction vessel relative to the roasted ore added to the pregnant liquor varies as a ratio of from about 1 to 1 to 3 to 1, and wherein the free acid content of the pregnant liquor following conditioning is reduced to a level corresponding to a pH ranging from about 2 to 2.8 referred room temperature.

14. The method of claim 13, wherein the pH of the conditioned pregnant liquor referred to room temperature ranges from about 2.2 to 2.5.

15. The method of claim 11, wherein the conditioned pregnant liquor is treated with a sulfide-producing agent to precipitate the nickel therein as nickel sulfide, and optionally cobalt sulfide and provide a barren liquor containing 10 to 20 gpl free sulfuric acid having a pH below 2, and wherein an amount of roasted magnesium-containing nickeliferous silicate ore containing over 5% Mg is added to said barren liquor sufficient to raise the pH to a level of about 5 to 7 to enable the disposal thereof to the environment.

16. The method of claim 15, wherein the sulfide-producing agent is $H_2S$.

17. A method for conditioning nickel laterite pregnant leach liquor in preparation for the recovery of nickel therefrom which comprises:

feeding nickel-containing leach liquor having a free acid concentration of about 10 to 80 gpl $H_2SO_4$ to a series of reaction vessels under atmospheric pressure comprising first, second and third reaction vessels serially connected and including at least one thickener at the end of said train of reaction vessels, said pregnant liquor having a temperature ranging from about 60° C. to 100° C. and passing from said first reaction vessel through each succeeding reaction vessel to said thickener, adding an amount of roasted high magnesium nickeliferous silicate ore containing over 5% Mg to the pregnant liquor at said atmospheric pressure in said second and third reaction vessels, the amount of roasted ore added to the series of vessels being at least sufficient to lower the free acid content of pregnant liquor entering the thickener as a pulp to a level corresponding to a pH ranging from about 1.8 to 3 referred to room temperature, conditioning a pulp of said pregnant liquor in said series of vessels under said atmospheric pressure by vigorously stirring said pulp while maintained at a temperature selected from said temperature range for a time at least sufficient to lower the free acid content of the pregnant liquor entering said thickener to said pH ranging from about 1.8 to 3 and to effect substantial precipitation of iron hydroxide and dissolved silica in said liquor, passing the treated pulp to said thickener to provide an underflow of residual roasted ore and an overflow of conditioned pregnant liquor, passing said pregnant liquor overflow to metal recovery, withdrawing said residual roasted ore from said thickener, and recycling a portion thereof to said first reaction vessel while adding roasted high-magnesium ore to said second and third reaction vessels, and while maintaining a flow of said recycle residual ore through said series of reaction vessels, the ratio by weight of recycle residual ore to the freshly roasted ore added to the pregnant liquor ranging from about ½ to 1 to 5 to 1.

18. The method of claim 17, wherein the amount of free acid in the pregnant liquor fed to said series of reaction vessels ranges from about 30 to 60 gpl $H_2SO_4$ and the temperature ranges from about 80° C. to 100° C.

19. The method of claim 18, wherein the roasted ore fed to the pregnant liquor contains about 8 to 30% Mg, wherein the amount of residual roasted ore recycled to the first reaction vessel relative to the roasted ore added to the pregnant liquor varies as a ratio from about 1 to 1 to 3 to 1, and wherein the free acid content of the pregnant liquor following conditioning is reduced to a level corresponding to a pH ranging from about 2 to 2.8 referred to room temperature.

20. The method of claim 19, wherein the pH of the conditioned pregnant liquor referred to room temperature ranges from about 2.2 to 2.5.

21. The method of claim 17, wherein the conditioned pregnant liquor is treated with a sulfide-producing agent to precipitate the nickel therein as nickel sulfide and optionally cobalt sulfide and provide a barren liquor containing 10 to 20 gpl free sulfuric acid having a pH below 2, and wherein an amount of roasted magnesium-containing nickeliferous silicate ore containing over 5% Mg is added to said barren liquor sufficient to raise the pH to a level of about 5 to 7 to enable the disposal thereof to the environment.

22. The method of claim 21, wherein the sulfide-producing agent is $H_2S$.

23. A method for conditioning nickel laterite pregnant leach liquor in preparation for the recovery of nickel therefrom which comprises:

feeding nickel-containing leach liquor having a free acid concentration of about 10 to 80 gpl $H_2SO_4$ to a series of reaction vessels under atmospheric pressure comprising first, second, third and fourth reaction vessels serially connected and including at least one thickener at the end of said series of reaction vessels, said pregnant liquor having a temperature ranging from about 60° C. to 100° C. and passing from said first reaction vessel through each succeeding reaction vessel to said thickener, adding an amount of roasted high-magnesium nickeliferous silicate ore containing over 5% Mg to the pregnant liquor at said atmospheric pressure to one or more of said reaction vessels, the amount of roasted ore added being at least sufficient to lower the free acid content of pregnant liquor entering the thickener as a pulp to a level corresponding to a pH ranging from about 1.8 to 3 referred to room temperature, conditioning a pulp of said pregnant liquor in said series of vessels under said atmospheric pressure by vigorously stirring said pulp while maintained at a temperature selected from said temperature range for a time at least sufficient to lower the free acid content of the pregnant liquor entering said thickener to said pH ranging from about 1.8 to 3 and to effect substantial precipitation of iron hydroxide and dissolved silica in said liquor, passing the treated pulp to said thickener to provide an underflow of residual roasted ore and an overflow of conditioned pregnant liquor, passing said pregnant liquor overflow of said conditioned pregnant liquor to metal recovery, withdrawing said residual ore from said thickener, and recycling a portion thereof to said first reaction vessel while adding roasted high-magnesium ore to said second and third reaction vessels, and while maintaining a flow of said recycle residual ore through said series of reaction vessels, the ratio by weight of recycle residual ore to the freshly roasted ore added to the pregnant liquor ranging from about ½ to 1 to 5 to 1.

24. The method of claim 23, wherein the amount of free acid in the pregnant liquor fed to said series of reaction vessels ranges from about 30 to 60 gpl $H_2SO_4$ and the temperature ranges from about 80° C. to 100° C.

25. The method of claim 24, wherein the roasted ore fed to the pregnant liquor contains about 8% to 30% Mg wherein the amount of residual roasted ore recycled to the first reaction vessel relative to the roasted ore added to pregnant liquor varies as a ratio from about 1 to 1 to 3 to 1, and wherein the free acid content of the pregnant liquor following conditioning is reduced to a level corresponding to a pH ranging from about 2 to 2.8 referred to room temperature.

26. The method of claim 25, wherein the pH of the conditioned pregnant liquor referred to room temperature ranges from about 2.2 to 2.5.

27. The method of claim 23, wherein the conditioned pregnant liquor is treated with a sulfide-producing agent to precipitate the nickel therein as nickel sulfide and optionally cobalt sulfide and provide a barren liquor containing 10 to 20 gpl free sulfuric acid having a pH below 2, and wherein an amount of roasted magnesium-containing nickeliferous silicate ore containing over 5% Mg is added to said barren liquor sufficient to raise the pH to a level of about 5 to 7 to enable the disposal thereof to the environment.

28. The method of claim 27, wherein the sulfide-producing agent is $H_2S$.

* * * * *